Patented June 9, 1925.

1,540,951

UNITED STATES PATENT OFFICE.

JOHN REICHEL, OF PHILADELPHIA, AND CHRISTOPHER ROOS, OF WALLINGFORD, PENNSYLVANIA, ASSIGNORS TO H. K. MULFORD COMPANY, A CORPORATION OF PENNSYLVANIA.

PROCESS OF GROWING LACTOBACILLI AND THE PRODUCT.

No Drawing.    Application filed June 19, 1924.    Serial No. 721,146.

*To all whom it may concern:*

Be it known that we, JOHN REICHEL, a citizen of the United States, residing at Philadelphia, in the county of Philadelphia and State of Pennsylvania, and CHRISTOPHER ROOS, a citizen of the United States, residing at Wallingford, in the county of Delaware and State of Pennsylvania, have invented new and useful Improvements in Processes of Growing Lactobacilli and the Product, of which the following is a specification.

This invention relates to the process of growing lactobacilli, such as *Bacillus acidophilus* and *Bacillus Bulgaricus* in a culture medium other than milk or whey with the object of obtaining an increased number of bacilli in the medium, and harvesting the growth in a compact ingesting volume or mass and thereby producing a new and original compact form of ingestable product that can be ingested in doses each containing the necessary number of bacilli in compact dispensible form and ingestable volume as distinguished from the voluminous doses in the quantity form of product containing the necessary number of bacilli that is dispensed and ingested as *Bacillus acidophilus* milk or whey.

The lactobacillus, such as *B. acidophilus* is an inhabitant and a part of the flora of the normal intestines; but it can be made to grow outside of the intestinal tract; can be made to flourish in milk as a culture medium. In the prior state of the art, it is familiar practice to take cultures that grow well in milk, and supply the *Bacillus acidophilus* for ingesting purposes in a form of milk preparation, commonly known as *B. acidophilus* milk. The milk preparations of *B. acidophilus* milk are prepared by growing the *B. acidophilus* organisms either in skimmed or whole milk, or whey, previously pasteurized or sterilized. The *Bacillus acidophilus* grown in the milk, or whey, increases rapidly in numbers, and when it reaches its maximum growth the presence of lactic acid becomes noticeable, which is also accompanied by the thickening of the milk. The growth of the *B. acidophilus* is inhibited by the increase in the lactic acidity which increases to the point of destroying or killing the bacilli in the milk culture. It has been shown that the maximum growth of *B. acidophilus* in milk may reach the number approximately of one billion organisms to the cubic centimeter. These figures are mentioned here, inasmuch as they are important in respect to the dosage of *B. acidophilus* milk, or *B. acidophilus* preparations, since it is believed that it is important to ingest a large number of viable *B. acidophilus*, and which importance cannot be overemphasized. The therapy of lactobacilli calls for a dosage of *B. acidophilus* milk of approximately one quart a day for the individual. That volume is sometimes reduced or exceeded; but it is common experience that in treating severe cases of chronic constipation it is frequently necessary to increase the dosage before obtaining beneficial results. It is safe to say that the customary dosage is close to one quart of *B. acidophilus* milk a day. One quart of *B. acidophilus* milk includes nine-hundred and sixty cubic centimeters, or, in round figures, approximately one thousand cubic centimeters; and each cubic centimeter of *B. acidophilus* milk with its maximum growth of bacilli will include one billion *acidophilus* bacilli. It may, therefore, be stated that the average dose of viable *B. acidophilus* irrespective of the milk includes approximately one thousand billion *acidophilus* bacilli. The bulk of the one thousand billion *B. acidophilus* bacilli in one quart of *B. acidophilus* milk approximates about from one to two grams in a moist state. The volume is from one to two cubic centimeters. To supply *B. acidophilus* in any other medium in the dosage recommended in lactobacillus therapy, it is necessary therefore to include approximately one thousand billion organisms in the daily dose. There are individuals who cannot consume a quart of *B. acidophilus* milk a day, and there are other individuals who cannot drink milk in any form, stated in familiar language, but who, nevertheless, are in need of or would be greatly benefited by lactobacillus therapy. The present process is directed to the size of dose required of *B. acidophilus* for the average person; namely, the number of *B. acidophilus* organisms in one quart of *B. acidophilus* milk, one thousand billion

*acidophilus* bacilli; with the object of reducing the volume of the media containing the bacilli, but nevertheless retaining the necessary number of bacilli in the dose, as referred to above.

In the present invention it has been demonstrated that a culture media other than skimmed or whole milk or whey can be prepared at a cost not exceeding the cost of milk, with growth factors allowing a rapid growth of *B. acidophilus* to a degree of concentration of number of viable *B. acidophilus* that will permit of the establishment of the dose in a small volume with the necessary number of bacilli as compared with a dose of *B. acidophilus* milk. The medium used for the purpose of growing *B. acidophilus* or *B. Bulgaricus* in the present invention is prepared by digesting milk or casein with a ferment or trypsin in the proportion based on the tryptic value of the ferment. It is rendered alkaline with sodium carbonate, and incubated six hours at 42° to 45° C. The medium is diluted with three to four volumes of water and the reaction adjusted to PH 7.0. The medium is sterilized under substantially fifteen pounds pressure for approximately thirty minutes in glass lined digestors, then cooled to about 40° C., and planted with *B. acidophilus* or *B. Bulgaricus* seed. The special advantages obtained by growing the bacilli in the artificial medium prepared by digesting milk or casein with a ferment or trypsin in the preparation based on the tryptic value of the ferment, especially as compared with the advantages of growing the bacilli in a culture medium of glucose broth, or glucose agar, are as follows: It possesses growth factors which encourage the rapid growth of viable bacilli in higher concentration than milk or whey, their growth being several times that attained or obtained in milk or whey, and the growth as a whole comprises a lactobacillus mass.

In carrying out the process a pure culture of *B. acidophilus* or *B. Bulgaricus* is taken, and regarded as the " seed." The temperature is maintained at about 40° C. for approximately thirty hours or until the maximum growth is obtained. The growth is removed from the culture media or harvested by means of settling, or by the use of the centrifuge. The mass of *B. acidophilus* or *B. Bulgaricus*, in each two grams, represents approximately the growth of *B. acidophilus* equal to the number of one thousand billion *B. acidophilus* obtained in a quart of *B. acidophilus* milk. The harvested mass of lactobacilli in the proportion stated, namely two grams, can be used in a moist state, with the addition of a filler, such as tapioca, flour, starch, sugar, gelatin, or other suitable substance, and be compressed, or it can be used without a filler, or it can be mixed with yeast, and subsequently be compressed into cakes, pellets, tablets, cylinders, or other forms, or the mass can be dried to a powder, or granular condition, and be converted into tablets. It is understood that the present invention is not limited to the use of the specific culture media defined herein in describing the process, but that the invention may include any other artificial culture media, or any natural culture media other than milk, skimmed milk or whole milk or whey, that is favorable for the growth of lactobacilli of an increased number with the object of attaining the present invention, which is the production of lactobacilli in plastic mass in a readily ingestible form whereby a convenient dose of lactobacilli may be obtained containing the approximate number of lactobacilli in a quart of lactobacillus milk. The culture medias intended to be used in the invention include such culture medias as will permit of the collection of the bacilli from the culture media for the purpose of harvesting or gathering them, in order to obtain several or many times the required dose of lactobacilli in a small ingestible mass or volume as compared with the dose of lactobacillus milk. Thus, it will be perceived that the required dose of *B. acidophilus* in the present invention is in a more extended useful form than that produced in *B. acidophilus* milk, and among other matters that may be stated, the product is obtained in smaller volume or mass than in lactobacillus milk; and the product is of signal utility as enabling the ingesting of the required number of bacilli in a dose without having to ingest as well a large volume of culture media milk, or ingest milk at all, as a part of the dose of bacilli, in order to ingest the required number of *B. acidophilus* or *B. Bulgaricus*; and further, it is of large utility in the art of producing the products of lactobacillus, such as *B. acidophilus* and *B. Bulgaricus* in a culture media other than milk, for putting the product on sale, and dispensing it, on a large scale, as the handling, treating, shipping, storing, dispensing and replacement of large quantities of milk is avoided; in brief, the present process of producing the B. *acidophilus* or *B. Bulgaricus* culture media and its product avoid many obstacles to the extensive and common use of *B. acidophilus* milk or *B. Bulgaricus* milk which are regarded as inherent, insuperable or unavoidable, and as being in the way of popularizing and enlarging the use of lactobacilli in a culture media other than milk or whey commonly by persons whose health might be materially benefitted could they ingest *B. acidophilus* or *B. Bulgaricus* in the prescribed proper number in accordance with the prescribed rules of lactobacillus therapy.

It was written above that the harvested mass of lactobacilli can be used in a moist state, with the addition of a filler; it is found that gelatin, or like substances, is highly suitable for the purpose, since it not only serves to hold the bacilli together in mass, but as it fills the interstices between the bacilli and also occludes them as a mass, it serves to preserve or retain the moisture or moist state of the bacilli, which is a valuable function, since only the viable organisms have lactobacillus therapeutic quality, and, therefore, if the moisture dries out the viability of the bacilli is greatly depleted, if not entirely lost. The use of gelatin therefore with the bacilli enables the product to remain efficient for a long time in respect to placing it on sale commercially for dispensing, and does not require the stock of bacilli on sale for dispensing purposes to be frequently replaced with new or fresh stock. In the case of *B. acidophilus* milk the milk kept the bacilli in a moist state, but that advantage was greatly lessened in commercially dispensing the product because of the fact that *B. acidophilus* milk on sale for dispensing soon becomes stale, and has to be replaced with fresh *B. acidophilus* milk. The gelatine occluded product can be sugar coated for the palate if desired. In mentioning gelatin, we do not intend to exclude any vehicle that can be used for a similar purpose.

Having thus fully described our invention, what we claim as new and desire to secure by Letters Patent is:

1. A method for obtaining lactobacillus mass containing substantially the same number of lactobacilli contained in *B. acidophilus* milk, or *B. Bulgaricus* milk, which consists in growing lactobacilli in a culture media or other than milk or whey.

2. A method of obtaining lactobacilli mass containing substantially the same number of lactobacilli contained in milk or *B. Bulgaricus* milk, which consists in growing lactobacilli in a culture media prepared by digesting casein with a ferment in proportions suited to the purpose, treating the mixture with an alkali, incubating the same for substantially six hours at 45° C. sterilizing, and cooling substantially to 40° C. and then planting the media with lactobacilli, and allowing them sufficient time to attain their maximum growth prior to harvesting, by settling or centrifugation.

3. A method for obtaining lactobacilli mass mixed with yeast, and compressed into shapes containing substantially the same number of lactobacilli contained in lactobacillus milk, which consists in growing lactobacilli in an artificial culture media, mixing it with yeast, and compressing the mixture into desired forms.

4. A method for obtaining lactobacilli mass containing substantially the same number of lactobacilli contained in lactobacillus milk, which consists in treating a culture medium with trypsin and then with an alkali, incubating the same for substantially six hours at 45° C., sterilizing, cooling substantially to 40° C. and then planting the media with lactobacillus, and allowing them sufficient time to attain their maximum growth, removing the growth from the media.

5. A method of obtaining lactobacillus mass with yeast and compressed into desired forms containing substantially the same concentration of lactobacilli contained in lactobacillus milk, which consists in adding to a culture medium a ferment capable of adding to the growth factors therein, planting the medium with lactobacillus, allowing them sufficient time to attain their maximum growth, removing the growth from the medium, and mixing it with yeast, and compressing the mixture into desired forms.

6. A new article of production, comprising a lactobacillus mass, containing the required number of *B. acidophilus* to the dose of lactobacillus milk and a culture media of smaller volume than lactobacillus milk.

7. A new product comprising lactobacilli in a culture media other than milk, the lactobacilli being approximately one to two cubic centimeters or two grams, the same being in concentration not less than the number of *B. acidophilus* in one quart of lactobacillus milk.

8. A new article of production, comprising the required dose of lactobacilli in a culture media other than milk that permitted the production of lactobacilli in substantially the same number in the dose as that produced in the required dose of lactobacillus milk.

9. A new article of production, comprising the required dose of lactobacilli in a culture media that permitted the production of lactobacilli in substantially the same number in the required dose as that produced in the required dose of lactobacillus milk, but the culture media of the required dose is of less volume than the milk media contained in said required dose.

10. A new article of production, comprised of lactobacillus mass in a moist state and gelatin.

Signed this 17th day of June, 1924.

JOHN REICHEL.
CHRISTOPHER ROOS.